United States Patent
Furodet

(10) Patent No.: US 9,158,665 B2
(45) Date of Patent: Oct. 13, 2015

(54) UNIT TEST OF MULTI-THREADED OBJECT-ORIENTED APPLICATIONS USING MOCKS

(75) Inventor: David Furodet, Pontcharra (FR)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 13/485,606

(22) Filed: May 31, 2012

(65) Prior Publication Data

US 2013/0326483 A1 Dec. 5, 2013

(51) Int. Cl.
G06F 9/44 (2006.01)
G06F 11/36 (2006.01)

(52) U.S. Cl.
CPC .................................. G06F 11/3688 (2013.01)

(58) Field of Classification Search
None
See application file for complete search history.

(56) References Cited

U.S. PATENT DOCUMENTS

| 7,996,816 | B2 * | 8/2011 | Francis et al. | 717/124 |
| 2011/0239194 | A1 * | 9/2011 | Braude | 717/124 |
| 2012/0047489 | A1 * | 2/2012 | Varadharajan | 717/124 |

OTHER PUBLICATIONS

Achenbach et al., Testing Object-Oriented Programs using Dynamic Aspects and Non-Determinism, 2010. Proceedings of the 1st Workshop on Testing Object-Oriented Systems, ETOOS '10, pp. 1-6.*

* cited by examiner

*Primary Examiner* — Lewis A Bullock, Jr.
*Assistant Examiner* — Melissa Alfred

(57) ABSTRACT

One embodiment of the present invention provides a system that facilitates testing a multi-threaded software application. During operation, the system, in response to invocation of a mock object, identifies a thread and determines whether the identified thread matches a description associated with an actor. The system, in response to the identified thread matching the description associated with the actor, evaluates whether an expectation is met or a stub is executed and returns a value based on the evaluation. In some embodiments, the expectation and the stub are expressed based on a role, wherein the role includes the actor and, optionally, one or more additional actors.

21 Claims, 8 Drawing Sheets

UNIT TEST OF MULTI-THREADED OBJECT-ORIENTED APPLICATIONS USING MOCKS

BACKGROUND

Software testing provides software developers with information about the quality of a software application. Typical testing methods involve investigation of different aspects of the software, such as tracing the execution path of software or finding software bugs (e.g., errors and failures). Software testing validates and verifies a software application by checking whether the software executes as expected and produces desired outputs. One form of software testing is referred to as "unit testing." In unit testing, rather than testing the entire behavior of a whole application, a software developer tests individual components or "units" of the application to confirm that the specific behaviors specified for or required by such particular "units" have been implemented correctly. For example, in object-oriented programming, such as JAVA brand computer programs, a unit might be an individual method or a class.

In JAVA brand computer programs, JUnit, widely used by developers, is a common unit test framework for testing JAVA brand computer program applications. JUnit provides a developer a set of JAVA brand computer program library classes that enables the developer to easily write pieces of testing code that validate the behavior of particular JAVA brand computer program classes or features (e.g., methods, etc.) that the developer has separately written as part of his actual JAVA brand computer program application. For example, in his testing code, the developer might instantiate an instance or object for a JAVA brand computer program class (e.g., myCalculator=new Calculator( )) that he has recently written and then invoke a JUnit library command that enables the developer to confirm that a particular input to a method of the JAVA brand computer program object actually produces an expected output (e.g., assertEquals(50, myCalculator.add(45, 4))). NUnit is a similar unit-testing framework for another popular object-oriented programming language, C# (C-sharp).

Unit tests that are more complicated than the above can further utilize an additional "mock" framework, such as EasyMock. In general, a "mock" that is created by such a mock framework simulates the behavior of objects or methods that may interact with other objects whose behavior is the subject of testing. For example, a mock framework may enable a developer who has not yet written an Adder class that is used in a multiply method of his Calculator class to create a "mock" of the Adder object so that he can test his recently written multiply method, which actually uses an Adder object:

```
public int multiply(int a, int b) {
    int x;
    int output = b;
    Adder adder = new Adder( );
    for x = 1 to a-1 {
        output = adder.add(output, b);
    }
    return output;
}
```

In his testing code, since the developer has not yet written the Adder class, he could instantiate a "mock" object of the Adder class and then specify, for example, that the add( ) method of the Adder class (i) should output 4 if called as Adder.add(2, 2), and (ii) should output 6 if called as Adder.add(4, 2). As such, the developer, using both the mock and unit test frameworks, could then test whether the code implementing the multiply method (see above) produces an expected output for multiply(3, 2), namely 6 (e.g., assertEquals(6, myCalculator.multiply(3,2))).

As can be seen from the foregoing, the combination of a unit-test framework and a mock framework facilitates testing of object-oriented code. However, common mock frameworks have a significant restriction when used with multi-threaded applications. Such mock frameworks can execute tests on a single thread and do not provide any efficient way to test classes or features that involve multiple threads.

Testing frameworks for multi-threaded applications need to deal with at least two significant issues: (i) how to report failed tests that may occur in a variety of spawned threads, and (ii) how to define thread-specific tests. For example, if a main thread that runs the testing code spawns another thread (e.g., due to the nature of the objects being run in the testing code), upon a failure of a particular test of the testing code during execution of the spawned thread, the spawned thread may throws an exception as a result of the failed test. Under current mock frameworks, however, the main thread that is running the testing code cannot catch the exception and therefore the failed test is not properly reported by the main thread. Additionally, although current mocking frameworks provide the capability to specify "stubs" (e.g., specifying, for example, the behavior of a mock object to simulate real objects, such as specifying that a mock object for Adder that receives a call of Adder.add(2, 2) should return the value 4) and "expectations" (e.g., specifying, for example, that a sequence of invocations of mock objects should occur during execution of the testing code such as specifying that the Adder.add( ) method should be invoked twice if the testing code is myCalculator.multiply(3, 2)) in the testing code, such current mocking frameworks do not provide support to define such stubs or expectations for a specific thread or set of threads.

While the existing mocking frameworks bring many desirable features to unit testing, some issues remain unsolved for multi-threaded applications.

SUMMARY

One embodiment of the present invention provides a system that facilitates testing a multi-threaded software application. During operation, the system, in response to invocation of a mock object, identifies a thread and determines whether the identified thread matches a description associated with an actor. The system, in response to the identified thread matching the description associated with the actor, evaluates whether an expectation is met or a stub is executed and returns a value based on the evaluation.

In a variation on this embodiment, the description associated with the actor corresponds to a thread object or a thread checker.

In a further variation on this embodiment, the thread checker is defined using a thread name, a class name, or a user-defined thread property.

In a variation on this embodiment, the system also stores an error associated with the actor, wherein the error is detected while evaluating whether an expectation is met or a stub is executed.

In a further variation on this embodiment, the system also shares the error with a testing thread.

In a variation on this embodiment, the expectation and the stub are expressed based on a role, wherein the role includes the actor and, optionally, one or more additional actors.

In a further variation on this embodiment, the system also creates a default role for a testing thread, wherein the default role is associated with an expectation or a stub not expressed based on a role.

In a further variation on this embodiment, the system also stores an error associated with the role, wherein the error is detected while evaluating whether an expectation is met or a stub is executed.

In a further variation on this embodiment, the system also shares the error with a second thread, wherein an actor corresponding to the second thread is included in the role.

In a further variation on this embodiment, the system also shares the error with a testing thread.

DETAILED DESCRIPTION

Figure 1A:
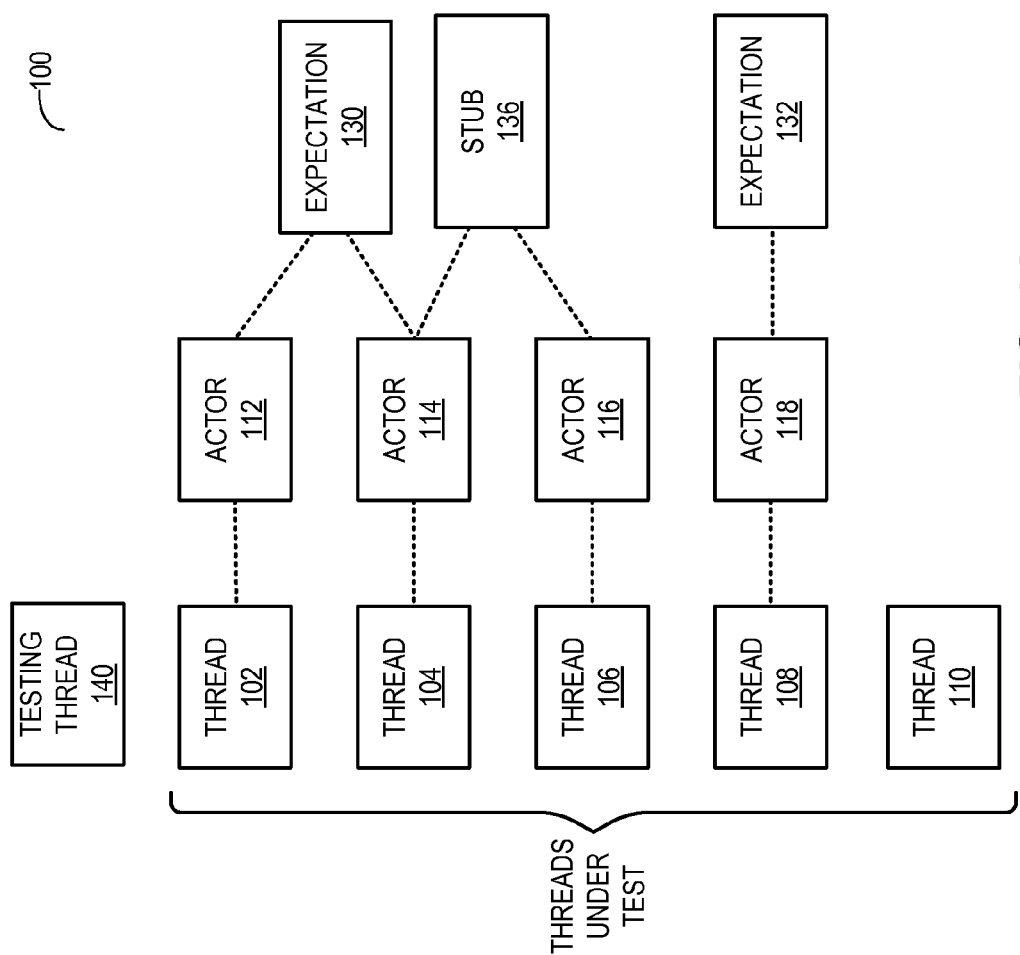
FIG. 1A illustrates an exemplary test on multiple threads associated with actors using LMock, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of performing mock-based unit tests in object-oriented programming for multi-threaded applications is solved by using a testing framework, called LMock, which facilitates detecting, storing, and sharing errors across multiple threads. Typical mock frameworks cannot perform efficient unit testing on multi-threaded applications. When threads are created independently in an application, existing frameworks cannot define a mock object for a specific thread. Furthermore, if an error occurs in a thread during a test, the error is hard to detect from outside of the thread. In embodiments of the present invention, the LMock framework defines actors, which contain identifying information for a thread. Whenever a mock is invoked, the current thread is matched with an actor using the identifying information. When matched, an actor becomes tied to the thread. Any subsequent reference to the actor provides a reference to the tied thread. In this way, LMock can specify a mock for a specific thread. Furthermore, expectations and stubs of a mock object can be defined based on a role. Whenever an error is encountered by the mock, the error is "guarded," or stored by the framework through roles. Consequently, any thread that can access the role can obtain information on the error. LMock creates a testing thread, which collects all errors from all mock objects at the end of the test and can obtain error information from independent threads. In some embodiments, the errors are forwarded to the testing thread so that the testing thread fails even when an error occurs in a different thread, indicating the overall test has failed. Hence, LMock provides an efficient way of mock testing in object-oriented programming for multi-threaded applications.

In some embodiments, LMock framework also facilitates masquerading. That is, the framework provides a simple programming interface which facilitates creating tests based on LMock instead of defining scenarios and stubs for individual objects directly. Additionally, masquerading allows one or more actors with a common scenario (i.e., a common set of expectations and stubs) to be associated with a role. When a respective actor associated with the role satisfies a test, the execution of the test is successful. Consequently, expectations and stubs of a plurality of actors can be defined based on a role. As a result, any thread tied to an actor associated with the role may meet the expectation and execute the stubs to satisfy the test. On the other hand, if one actor incurs an error, the mock object guards the error. Consequently, any thread tied to an actor associated with the role that invokes the mock object receives the error information, raises the corresponding error, and terminates execution of the thread. Essentially, defining roles allows the framework to specify a testing scenario for one or more actors, wherein any actor can satisfy the test or raise an error for the role.

In this disclosure, the term "mock object" refers to a simulated object that imitates the functionalities of a real object in controlled ways. In this disclosure, the terms "mock object" and "mock" are used interchangeably. Any object that mimics the functionalities of an object to test the behavior of some other object can be referred as a mock object. A mock object facilitates interaction based testing of the behavior of another object by recording and verifying the interaction between two classes.

The term "scenario" refers to an expected sequence of invocations of a corresponding mock that should be verified by the object to comply with the test. The term "expectation" refers to a test assertion expressed using a mock for an object under a test. An expectation is one of the expected invocations.

The term "stub" refers to any software code which simulates the functionalities of software modules upon which the object under a test depends.

The term "thread under test" refers to a thread being tested in a multithreaded environment. Any thread upon which a test is being performed can be referred as a "thread under test."

The term "testing thread" refers to a thread that facilitates a test on a thread under test. The thread that initiates, executes, and/or evaluates a test on another thread is referred to as a "testing thread."

The term "scenario" refers to a set of expectations and stubs defined for a mock object.

The term "error" refers to a situation where an expectation is not met, a stub is not executed correctly, or any other form of error associated with a test or the execution of the tested unit. The term "guarding an error" refers to storing information regarding an error.

LMock Framework

To perform a test on a software application in a multi-threaded environment, a testing thread is created. The testing thread initiates, executes, and evaluates tests on other threads (known as threads under test) in the application. However, detecting failures incurred by multiple threads under test is difficult because threads usually do not share information. Furthermore, when an exception occurs during the test, associating the exception with the thread that raised the exception is difficult. To solve this problem, the LMock framework provides a way to identify a respective thread under test in real time.

Whenever a thread invokes a mock, LMock checks whether the thread is already known. If not, LMock checks whether the thread is associated with a scenario containing a set of expectations and stubs defined by the testing thread. Such a set can be referred as an actor. Hence, a respective scenario can be associated with a respective actor. LMock identifies a thread under test by identifying the corresponding actor, and can associate a failure or an exception with the corresponding thread under test.

FIG. 1A illustrates an exemplary test on multiple threads associated with actors using LMock, in accordance with an embodiment of the present invention. In this example, the LMock framework facilitates a test 100 for threads 102, 104, 106, 108, and 110. These threads can be referred to as threads under test. A respective thread under test can be invoked in the course of execution of the test, and a subset of the threads can be concurrent at a given point of time. Also included is testing thread 140 that collects error information from all threads under test. Threads 102 and 104, and threads 104 and 106 are interdependent (i.e., testing of one thread depends on the execution of the other). Interdependent threads may or may not be concurrent. Actors 112, 114, 116, and 118 are defined for the test, wherein actors 112 and 114 follow expectation 130 (i.e., threads associated with actors 112 and 114 are tested with expectation 130), and actors 114 and 116 use stub 136 (i.e., threads associated with actors 114 and 116 are tested with stub 136). Actor 118 follows expectation 132.

During operation, thread 102 invokes a mock. The LMock framework then examines all actors that are not associated with a thread (referred as untied actors) and checks whether any actor matches a description of thread 102. In some embodiments, the description can be for a thread object, a name associated with a thread, a class definition from which a thread is derived, or any thread invoking a mock object. Upon matching a description, actor 112 becomes tied with thread 102. This tie remains persistent through the lifetime of the test. As a result, whenever thread 102 is executed, actor 112 acts as a "handle" and associates thread 102 with expectation 130. Similarly, during operation, thread 104 invokes a mock. Consequently, the LMock framework examines the untied actors for a match in description. Note that because actor 112 is already tied to thread 102, actor 112 is not considered for thread 104. Upon matching a description, thread 104 becomes tied to actor 114 and associated with expectation 130 and stub 136. Similarly, thread 106 becomes tied to actor 116 and associated with stub 136.

Because threads 102 and 104, and threads 104 and 106 are inter-dependent, their execution leads to a predictable sequence of invocations. Hence, a single scenario can be created for each set of inter-dependent threads. For example, threads 102 and 104 follow the same expectation 130. Thread 108 is independent, and may require its own scenario. During operation, thread 108 becomes tied to actor 118 and associated with expectation 132. If thread 108 invokes a method associated with a mock object, the mock object identifies the method in expectation 132 (referred as invoking an expectation). After the invocation, expectation 132 might stop matching further invocations. For example, if expectation 132 is defined to match only once, all subsequent invocations are ignored. However, if expectation 132 is defined to match at least once, expectation 132 is always matched against invocations. Whenever an error occurs due to wrong invocation of an expectation or a stub, the corresponding mock object guards the error so that the error can be collected by testing thread 140 at the end of the test. Thread 110 does not invoke any mock; hence, it is not associated with any actor, and may not be detected by LMock. If a thread under test does not invoke any mock object, such as thread 110, the thread cannot be associated with an actor by the LMock framework, and does not contribute to the test from the LMock framework's standpoint.

If the LMock framework is not used, any error in thread 102 would not be captured by another independent thread from outside of thread 102. Furthermore, an error in thread 102 would not be forwarded to testing thread 140 at the end of the test. Hence, testing thread 140 cannot access the error from thread 102, unless thread 102 is created from testing thread 140. However, because threads are typically implicitly created through the execution of an application, creating threads under test from a testing thread is not realistic. Furthermore, thread-specific tests, such as expectation 132 for independent thread 108, cannot be specified because a testing thread cannot identify a specific thread.

Figure 1B:
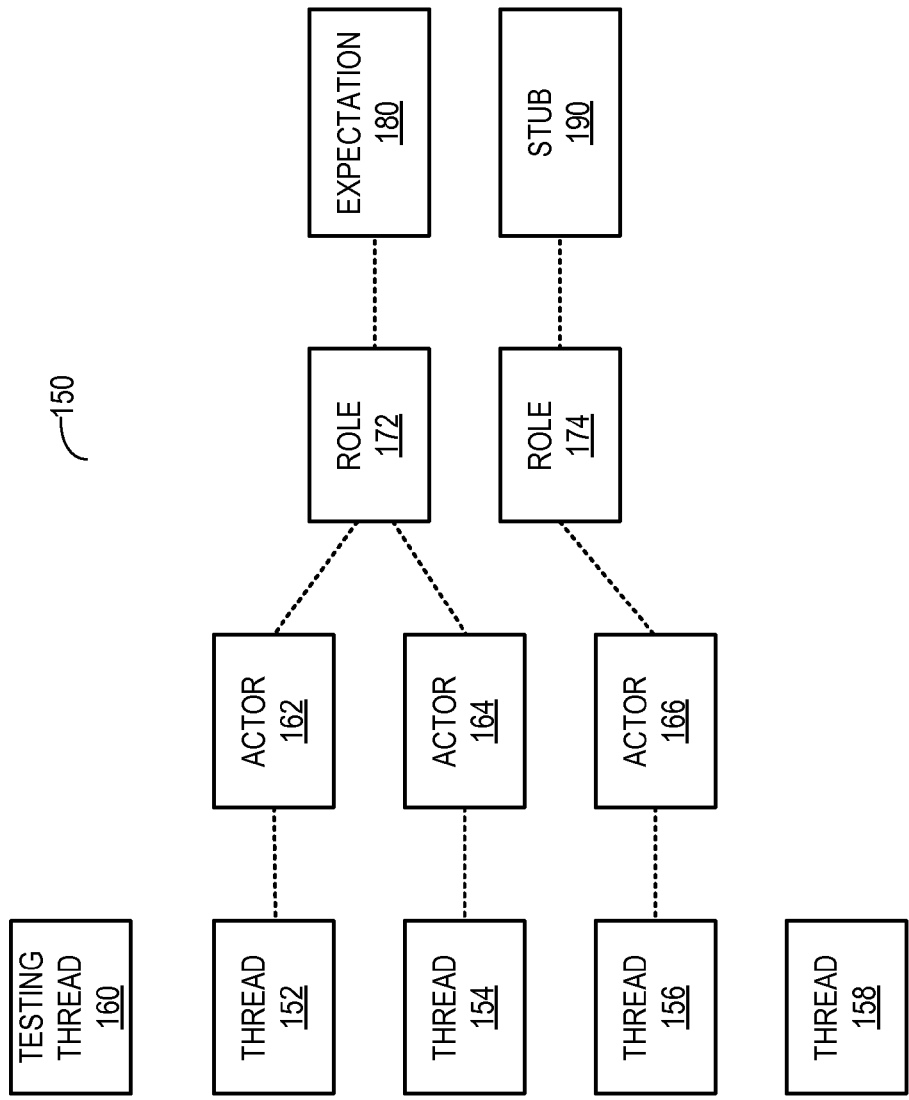
FIG. 1B illustrates an exemplary test on multiple threads associated with roles using LMock, in accordance with an embodiment of the present invention.

FIG. 1B illustrates an exemplary test on multiple threads associated with roles using LMock, in accordance with an embodiment of the present invention. In some embodiments, the LMock framework facilitates masquerades. Masquerades provide a convenient way of defining LMock elements (e.g., scenarios, stubs, etc.), without manually defining the underlying details. Using masquerades, a user (e.g., a programmer) can create tests directly using the LMock framework instead of defining separate scenarios and stubs for individual objects. For example, a conventional way to define a test using JMock might be:

```
Scenario scenario = new Scenario( ) {{
    ... // define the expectations here, with a non-user
friendly syntax:
    expect( ).foo.bar(...); willOccur(1);...
}};
Stubs stubs = new Stubs( ) {{
    ... // same kind of syntax.
}};
Story story = new Story(scenario, stubs);
story.begin( );
... // The test
story.end( );
``` whereas the same test can be written in a more succinct way using a masquerade:

```
begin( );
willinvoke(1).of(foo).bar( );
... // define the expectations and stubs
... // The test
end( );
```

Additionally, in a multi-threaded environment, masquerading allows specifying a role for multiple actors, thereby linking multiple threads. A role can be associated multiple actors. When a respective actor associated with the role satisfies a test, the execution of the test is successful. In this example, the LMock framework facilitates a test 150 that includes testing thread 160 and threads under test 152, 154, 156 and 158. Actors 162, 164, and 166 are defined for the test, wherein actors 162 and 164 have a similar scenario. Hence, actors 162 and 164 are associated with role 172, and actor 166 is associated with a separate role 174. Expectation 180 is defined for role 172 and stub 190 is defined for role 174.

During operation, threads 152, 154, and 156 become tied to actors 162, 164, and 166, respectively. Because actors 162 and 164 are associated with role 172, and actor 166 is associated with role 174, threads 152 and 154 become associated with role 172 and thread 156 becomes associated with role 174. Furthermore, because expectation 180 is defined for role 172, either thread 152 or 154 can meet expectation 180. Any wrong invocation in either of the threads leads to an error and the role is then marked as "in error." For example, during invocation of role 172 (i.e., invocation of expectation 180) in thread 152, if a wrong invocation occurs for expectation 180, role 172 is marked as "in error." When thread 154 invokes role 172, thread 154 understands that role 172 is already in error. Consequently, thread 154 raises the error and can terminate the execution. Similarly, thread 156 invokes role 174 (i.e., stub 190) and executes stub 190. If role 174 is invoked correctly, no error is associated with the role. This mechanism allows the LMock framework to test threads individually. In this example, thread 156 executes the test 150 correctly, while threads 152 and 154 cause errors. Note that because thread 158 does not invoke any mock object, it is not associated with any role and not detected by LMock.

At the end of the test, testing thread 160 obtains the errors from each role in test 150. In some embodiments, testing thread 160 calls an "end( )" method to invoke the end of test 150. Testing thread 160 then checks each role for errors and collects the errors. In some embodiments, the errors are forwarded to testing thread 160 so that testing thread 160 fails even when the error occurs in thread 152, indicating that the overall test has failed. Testing thread 160 can display the errors on a console of a display device. Furthermore, testing thread 160 can optionally display the errors in a report form on a user interface (UI) of a display device. A user (e.g., a developer or a tester) can access a respective error occurring in an individual thread or a group of threads from the console or from the UI. Furthermore, testing thread 160 is associated with a default role. If an expectation or stub is defined without specifying a corresponding role, the expectation or stub is associated with the default role. In this way, the LMock framework provides an implicit role and allows the creation of scenarios using this implicit role for the testing thread.

Declarations

LMock makes a distinction between a testing thread, which is the thread that runs a test, and the threads under test, which are spawned during execution of the test. The testing thread can also be a thread under test if the testing thread actively contributes to the execution flow of the test. The testing thread facilitates the declaration of different elements contributing to the test. Such elements include mocks, actors, roles, scenarios, expectations, and stubs. The mocks are declared in the testing thread to simulate the behavior of specific classes and verify the compliance of the execution flow with the expectations. A number of actors and roles are declared in the testing thread to represent the threads under test and to express the expectations and stubs, respectively. During operation, a respective thread under test invokes a mock object. The LMock framework ties the thread with a respective actor declared in the testing thread. A role associated with the tied actor then becomes liked with the role. Consequently, an expectation or stub defined for the role is invoked.

Figure 2A:
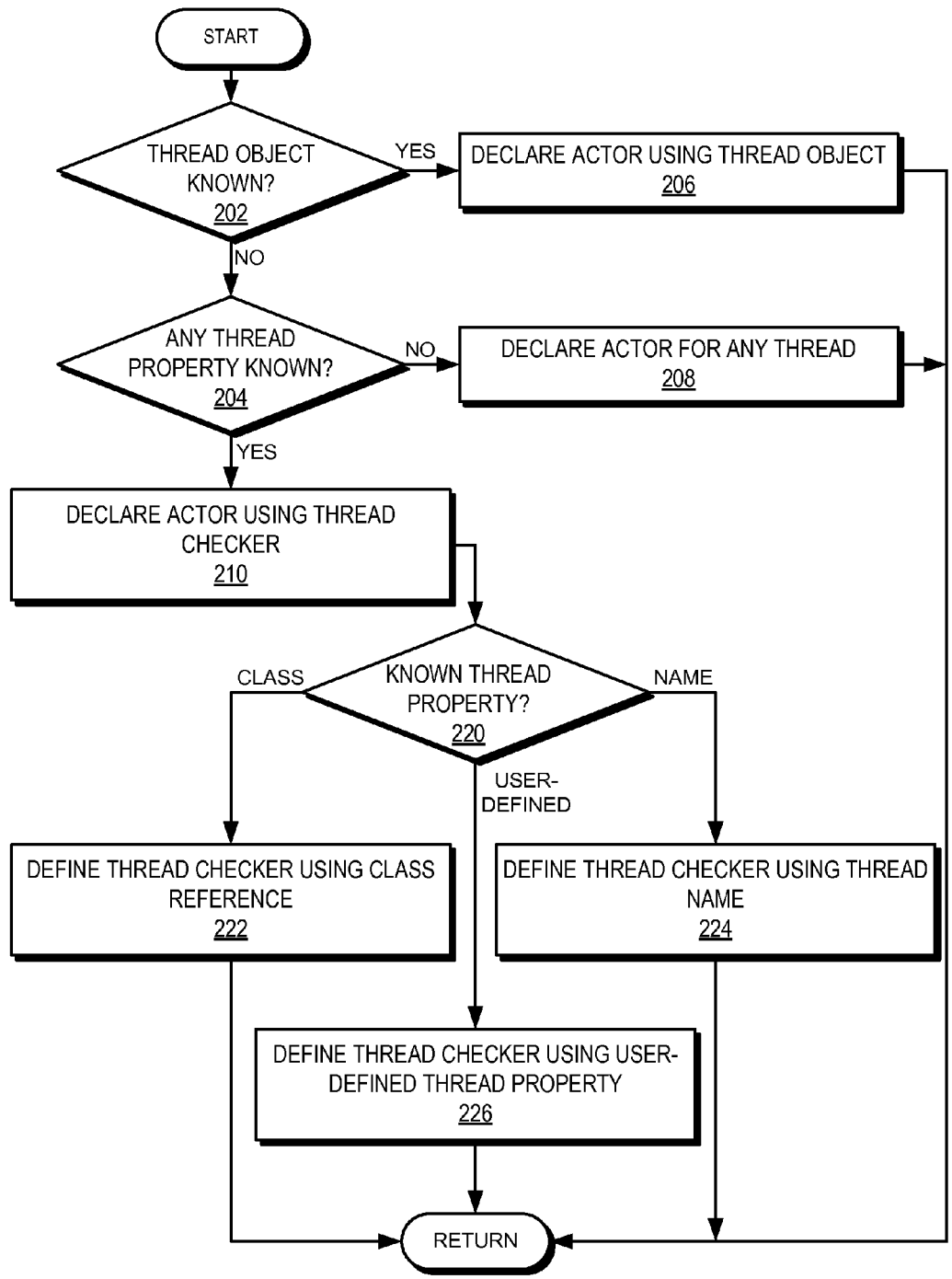
FIG. 2A presents a flowchart illustrating a process of declaring an actor for a test in an LMock framework, in accordance with an embodiment of the present invention.

FIG. 2A presents a flowchart illustrating a process of declaring an actor for a test in an LMock framework, in accordance with an embodiment of the present invention. The declaration process can be performed by a user using a UI (e.g., a text editor). During operation, the declaration process first checks whether the thread object for which the actor is being declared is known (operation 202). If so, then an actor object is declared using the thread object by passing the object as a parameter to the actor (operation 206). For example, an actor actor1 associated with Thread t can be declared as Actor actor1=anActorForThread(t). The parameter t can also be passed via a constructor. If the object is not known, the process checks whether any property of the thread is known (operation 204). If no property of the thread is known, then an actor is declared for any thread invoking a mock object (operation 208). For example, an actor actor1 declared for the first thread that invokes a specific mock can be declared as Actor actor1=anActorForAnyThread( ). Note that if an actor is declared for any thread, any thread invoking a mock can match with the actor.

If any property of the thread is known, then an actor is declared using a thread checker (operation 210). For example, an actor actor1 associated with ThreadChecker checker can be declared as:

Actor actor1=anActorForThreadLike(checker).

A thread checker can have a set of standard matchers, wherein a specific matcher corresponds to a specific known property of a thread. The thread checker can be declared using a matcher based on the known property of the thread, thereby connecting the known property to the actor. The declaration process checks which property of the thread is known (i.e., which predefined matcher corresponds to the known property) (operation 220). If the class of which the thread is an instance is known, then the thread checker is defined based on a matcher which uses a reference to a class (operation 222). For example, a thread-checker checker can be declared for a class TClass as ThreadChecker checker=instancesOf (TClass). If a name of the thread is known, then the thread checker is defined based on a matcher which uses the name of the thread (operation 224). Note that unlike a thread object, the name of the thread is defined as a string. An actor is created using the name of a thread when a specific object of the thread is not known to the testing thread. For example, a thread-checker checker can be declared for a thread name stored in string name as:

ThreadChecker checker=threadsCalled(name).

In some embodiments, a thread checker can be defined based on any user-defined property of a thread. A thread checker allows a user to define specific procedure (i.e., a matcher) to recognize threads. If any user-defined property is known, then the thread checker is defined accordingly (operation 226).

Figure 2B:
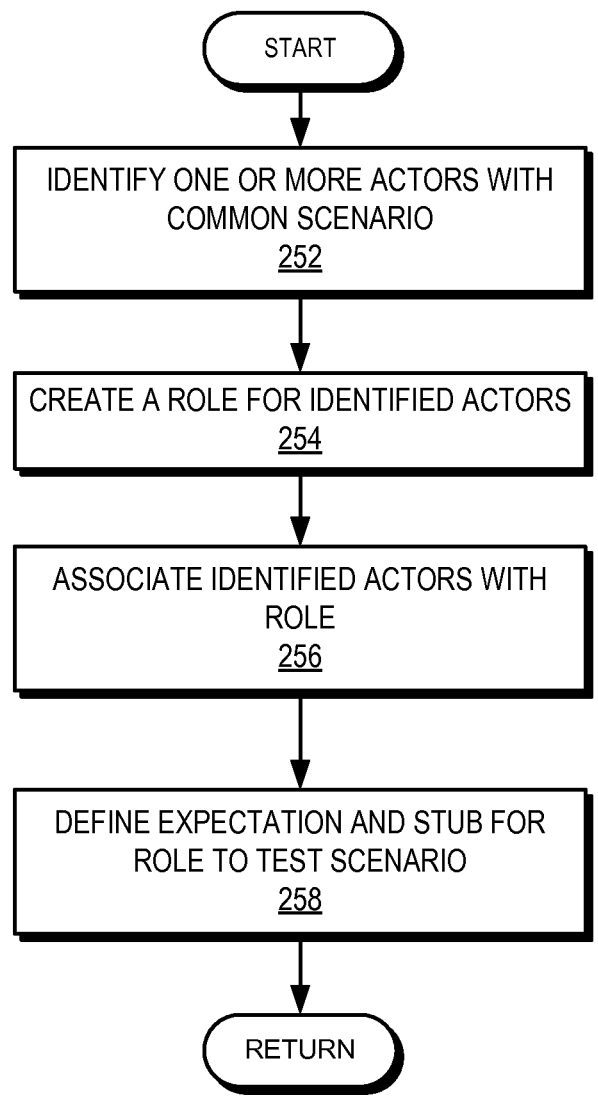
FIG. 2B presents a flowchart illustrating a process of declaring a role associated with one or more actors for a test in an LMock framework, in accordance with an embodiment of the present invention.

FIG. 2B presents a flowchart illustrating a process of declaring a role associated with one or more actors for a test in an LMock framework, in accordance with an embodiment of the present invention. The declaration process first identifies one or more actors with a common scenario (operation 252). Then the process creates a role for identified actors (operation 254). Note that a single actor can be associated with an independent scenario and can be associated with a separate role. For example, a role role1 associated with two actors actor1 and actor2 can be declared as:

Role role1=new Role(actor1,actor2).

Figure 3:
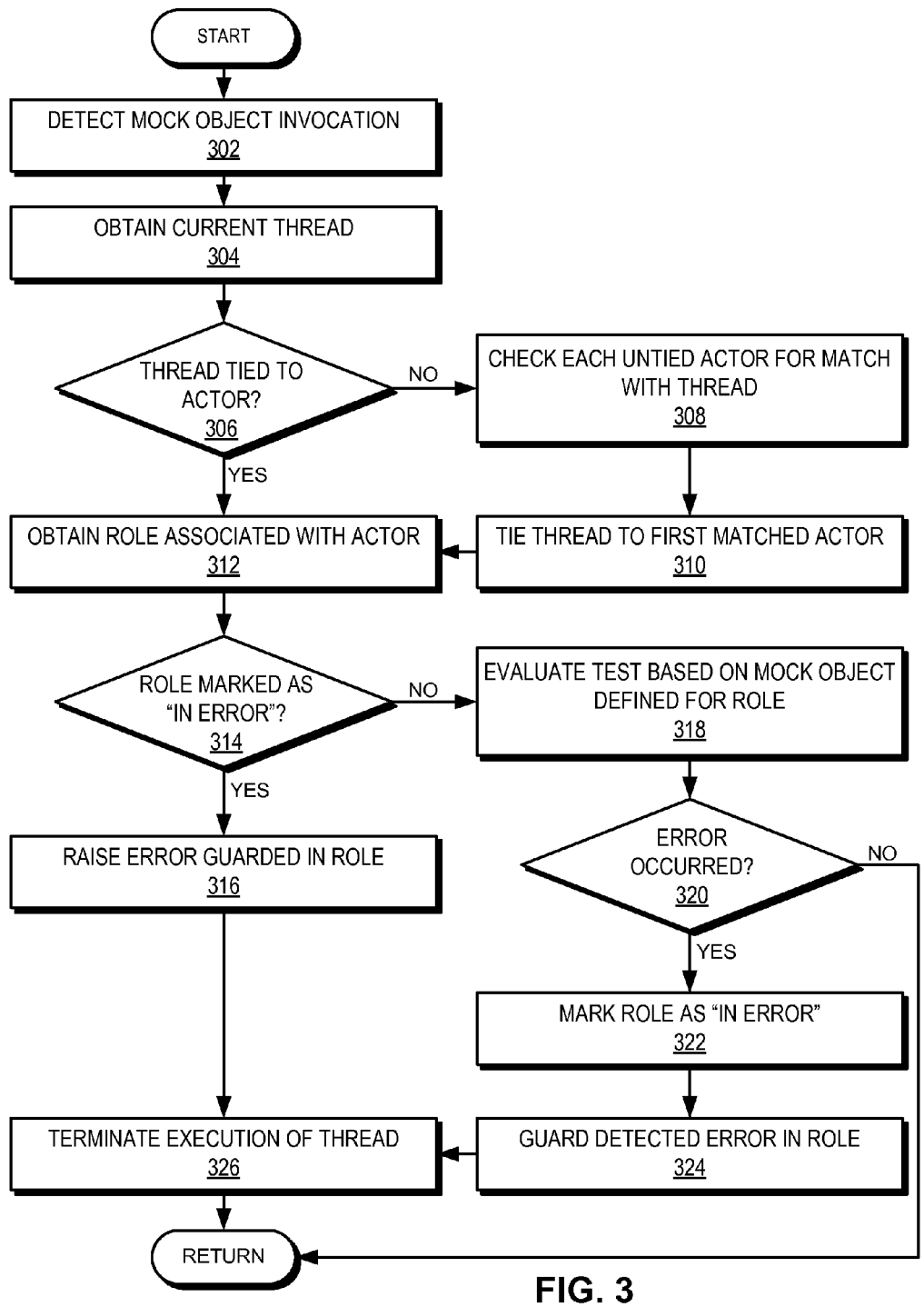
FIG. 3 presents a flowchart illustrating a process of an LMock framework executing a test for a multi-threaded application, in accordance with an embodiment of the present invention.

The declaration process then associates the identified actors with the role (operation 256) and defines expectations and stubs for the role to test the scenario (operation 258). For example, expectations and stubs for role1 can be declared as role1.willInvoke(1).of(object1).method1(abc); // expectation
    role1.willreturn(true).when(object1).method2( );// stub In this example, in the first line, an expectation for role role1 is declared such that when running the test, either actor1 or actor2 is expected to invoke a method method1 of an object object1 once and only once with parameter abc. Similarly, in the second line, a stub for role role1 is declared such that whenever either actor1 or actor2 invokes a method method2 of the object object1, the return value is going to be true. Another typical use case for LMock can be declared as role1.willInvoke(1).willReturn(true).when(object1)
    .method3(xyz)
In this example, either actor1 or actor2 is expected to invoke a method method3 of an object object1 once and only once with parameter xyz and whenever method3 is invoked, the return value is going to be true. The LMock framework implicitly manages a default role for the testing thread. The default role allows using the "traditional" directives to define a test. The default role can share a scenario with other roles. In some embodiments, a respective role includes a method to access the default role for sharing a scenario. For example, an expectation the default role can be declared as
willInvoke(1).of(object1).method3(xyz);//expectation
In this example, an expectation for the default role is declared such that the testing thread is expected to invoke a method method3 of the object object1 once and only once with parameter xyz.
Execution The LMock framework handles invocations of mocks in a multi-threaded context. FIG. 3 presents a flowchart illustrating a process of an LMock framework executing a test for a multi-threaded application, in accordance with an embodiment of the present invention. The framework first detects a mock object invocation (operation 302) and obtains the current thread that has invoked the mock object (operation 304). As the mock object is declared in the testing thread, the invocation of the mock object can be detected by the testing thread. The current thread can be obtained by calling a function (e.g., a system call) that returns an identifier of the current thread. The framework then checks whether the thread is already tied to an actor (operation 306). If so, the framework obtains the role associated with the actor (operation 312). If the thread is not tied to an actor, the framework checks each untied actor for a match with the thread (operation 308). The framework, however, does not check the actors already tied to a thread. The match between the thread and an actor depends on the property based upon which the actor is declared, as described in conjunction with FIG. 2A. The framework then ties the thread to the first matched actor (operation 310) and obtains the role associated with the actor (operation 312).

After obtaining the role, the framework checks whether the associated role is marked as "in error" (operation 314) indicating that at least one actor associated with the role has incurred an error. If so, the error guarded in the role is raised (operation 316) and the execution of the thread is terminated (operation 326). If the role is not in error, the framework evaluates the test based on the mock object defined for the role (operation 318) and checks whether any error occurs (operation 320). The evaluation of the test includes invoking an expectation or a stub declared for a respective thread. The evaluation step (operation 318) is further described in conjunction with FIG. 4. If so, the role is marked as "in error" (operation 322). In addition, the error is guarded in the role (operation 324), and the thread is terminated (operation 328).

If no error occurs during the mock invocation (i.e., the expectation is met and/or a stub is executed without an error), the thread completes the flow of execution. In some embodiments, a testing thread initiates the end of a test that ends the flow of execution. At the end of the test, the testing thread accesses each role to examine the encountered error. By checking the guarded error, the testing thread facilitates the detection of errors associated with individual roles (i.e., errors associated with a single thread or a group of threads, as needed). The testing thread can further produce an error report based on the errors and allows a user to access the error report.
Evaluation and Validation LMock typically includes a final validation step to check whether all the expectations defined by the test have been met (i.e., the scenarios are completed). In some embodiments, invocation of the validation step is achieved by the testing thread invoking an end( ) method. The LMock framework, after the end( ) method invocation, forwards guarded errors, so that the testing thread fails even if an error was produced by another thread.

Figure 4:
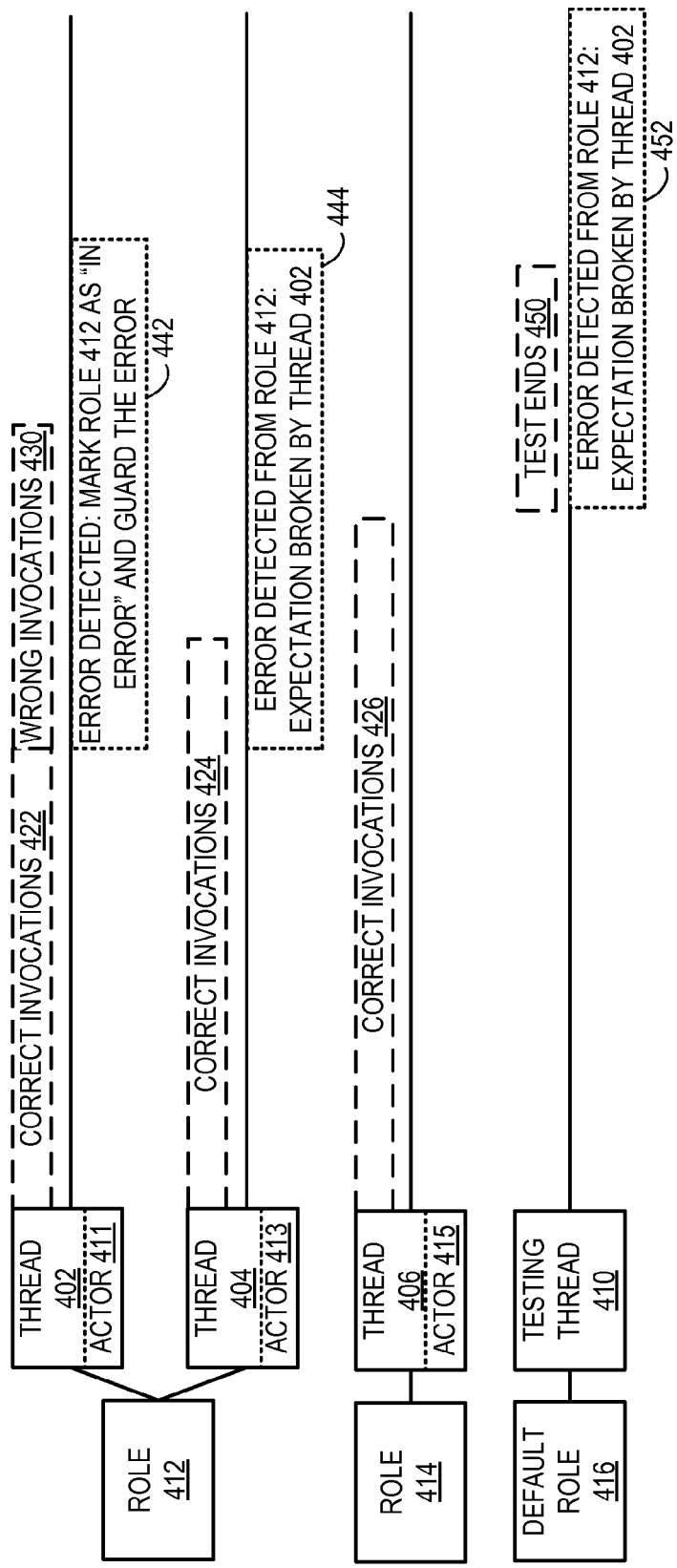
FIG. 4 illustrates an exemplary scenario of an LMock framework detecting, storing, and sharing an error across multiple threads, in accordance with an embodiment of the present invention.

FIG. 4 illustrates an exemplary scenario of an LMock framework detecting, storing, and sharing an error across multiple threads, in accordance with an embodiment of the present invention. During operation, actors 411, 413, and 415 become tied to threads 402, 404, and 406, respectively. Role 412 is associated with actors 411 and 413, and role 414 is associated with actor 415. Implicit default role 416 is associated with testing thread 410. Either actor 411 or 413 can raise an error or successfully execute a test for role 412.

When a thread under test such as thread 402 fails, this failure is reported by an exception or an error. If the LMock framework is not used, the thrown error is never trapped by testing thread 410. Consequently, the error is not properly reported. The LMock framework solves this problem by guarding the error reported by thread 402 and forwarding that error to testing thread 410 when the test completes. In some embodiments, the end of the test is based upon invocation of the end( ) method. Moreover, because thread 402 contributes to a scenario shared with thread 404, thread 404 is also interrupted whenever thread 404 invokes a mock.

In this example, threads 402, 404, and 406 first perform correct invocations 422, 424, and 426, respectively, to mock objects. When thread 402 makes a wrong invocation 430 to the mock object for role 412 (i.e., not complying with a scenario for role 412), LMock immediately provides thread 402 with an error 442, marks role 412 as "in error," and guards the error in the mock object for role 412. Upon invoking the mock object, thread 404 then observes that role 412 is marked as "in error" and gets the guarded error 444. Thread 406 does not share a scenario with thread 402; hence, thread 406 does not see the error at all. Finally, the end of the test 450 is invoked by testing thread 410. In some embodiments, the testing thread invokes an end( ) method to end the test. At this point, the guarded error incurred in thread 402 is forwarded to testing thread 410. Testing thread 410 can further raise the guarded error 452 to indicate the overall test has failed. The error 452 can be reported to a user by the LMock framework.

Figure 5:
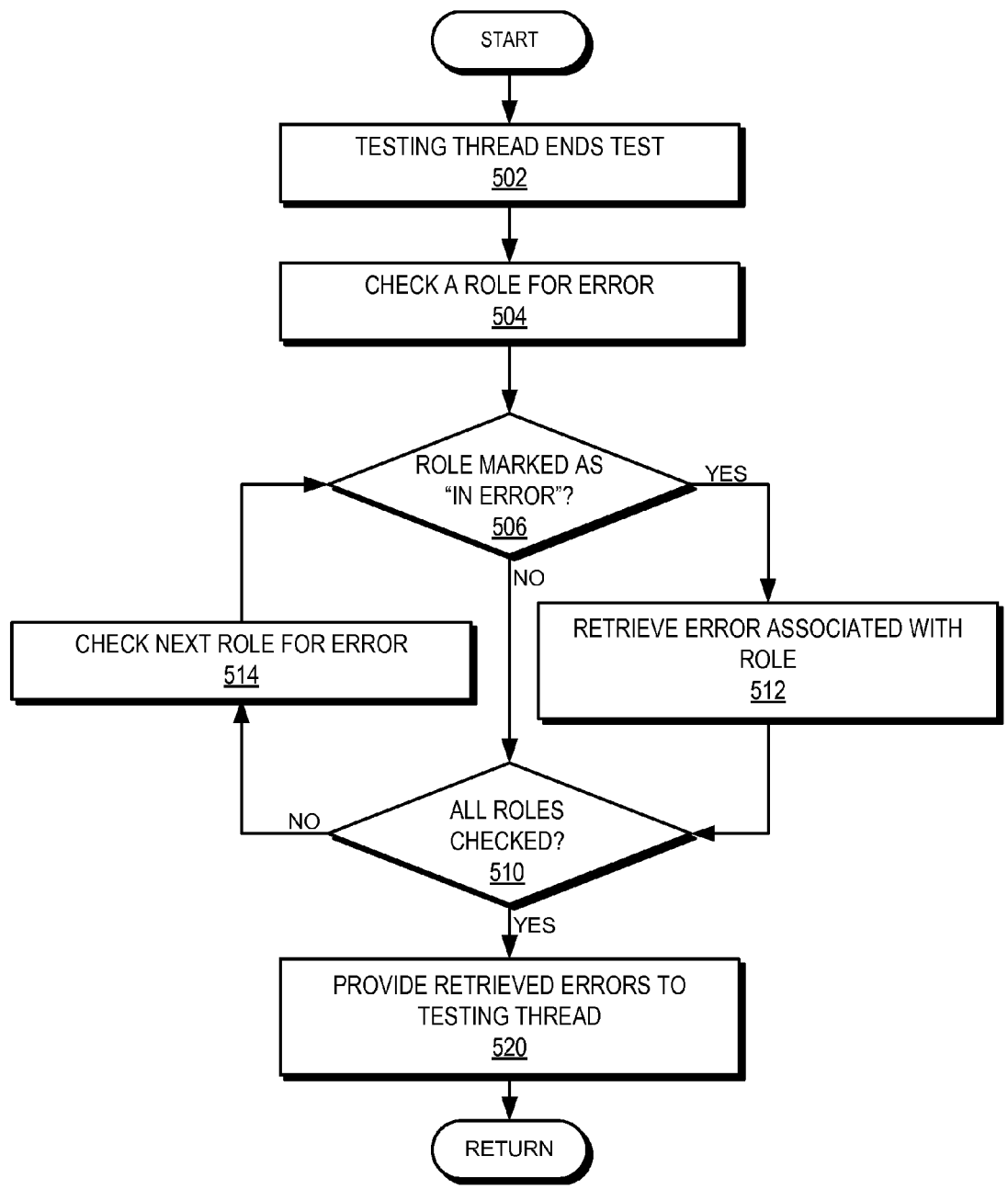
FIG. 5 presents a flowchart illustrating a process of an LMock framework evaluating and validating a test for a multi-threaded application, in accordance with an embodiment of the present invention.

FIG. 5 presents a flowchart illustrating a process of an LMock framework evaluating and validating a test for a multi-threaded application, in accordance with an embodiment of the present invention. When the testing thread of the LMock framework ends the test (operation 502), the framework checks a role (i.e., a mock object for the role) for an error (operation 504). If a role is marked as "in error" (operation 506), a guarded error is retrieved from a mock object for the role (operation 512). If the role is not marked as "in error" (operation 506) or after the guarded error is retrieved (operation 512), the framework checks whether all roles defined for the test have been checked (operation 510). If not, then the framework checks the next role for an error (operation 514).

The LMock framework continues to check each role for the test until all roles are checked. When all roles are checked (operation 510), the framework provides the retrieved errors to the testing thread (operation 520). In some embodiments, the retrieved errors are forwarded to the testing thread so that the testing thread fails even when the retrieved errors occur in different threads, indicating the overall test has failed.

System Architecture

Figure 6:
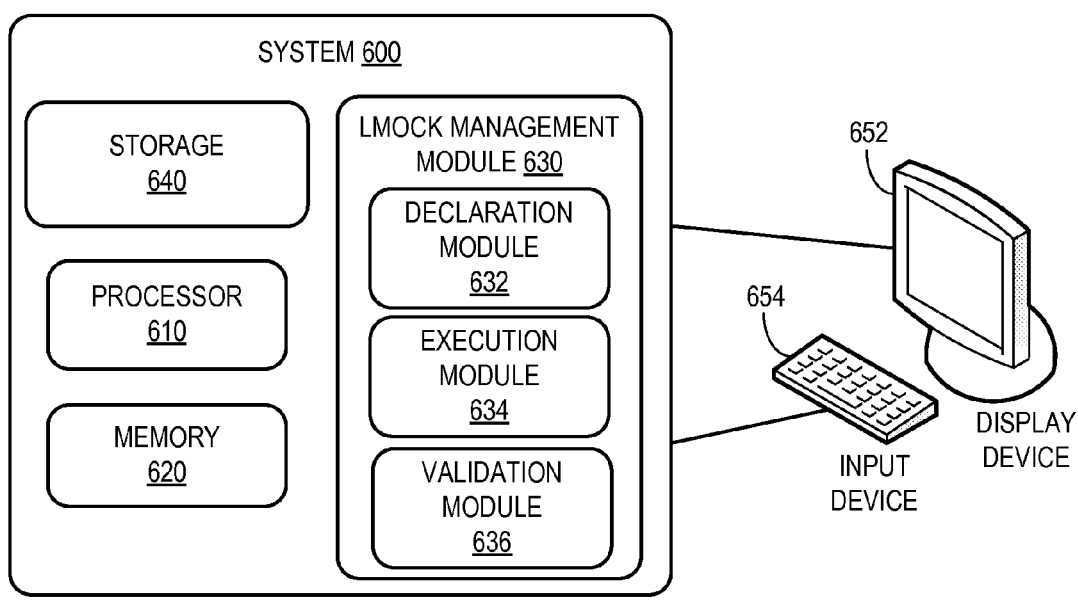
FIG. 6 illustrates an exemplary architecture of a system with LMock support, in accordance with an embodiment of the present invention.

FIG. 6 illustrates an exemplary architecture of a system with LMock support, in accordance with an embodiment of the present invention. In this example, system 600 includes a processor 610, a memory 620, an LMock management module 630, and a storage 640. In some embodiments, a display device 652 and an input device 654 are coupled to system 600. LMock management module 630 also includes a declaration module 632, an execution module 634, and a validation module 636.

During operation, system 600 receives instructions via input device 654. In some embodiments, system 600 receives instructions from a UI via display device 652. The received instructions are loaded into memory 620. In some embodiments, operational instructions for the LMock framework are stored in storage 640. During operation, the operational instructions are also loaded into memory 620. Processor 610 executes instructions from memory 620 and operates LMock management module 630 to execute a unit test in an object-oriented programming language. In some embodiments, the object-oriented programming language is Java.

Based on the operational commands from processor 610, declaration module 632 facilitates the declaration of actors, roles, and thread checkers, and the declaration of a unit test. In some embodiments, declaration module 632 relies on the user instructions in memory 620 for the declarations, as described in conjunction with FIGS. 2A and 2B. Execution module 634 executes a test based on the declarations provided by declaration module 632, as described in conjunction with FIG. 3. When the test ends, validation module 636 validates and checks the errors that occurred during the test, as described in conjunction with FIG. 5. In some embodiments, the errors are shown to a user via display device 652. In some further embodiments, the errors are stored in storage 640.

Note that the above-mentioned modules can be implemented in hardware as well as in software. In some embodiments, one or more of these modules can be embodied in computer-executable instructions stored in a memory which is coupled to one or more processors in system 600. When executed, these instructions cause the processor(s) to perform the aforementioned functions.

During operation, system 600 receives instructions via input device 654. In some embodiments, system 600 receives instructions from a UI via display device 652. The received instructions are loaded into memory 620. In some embodiments, operational instructions for the LMock framework are stored in storage 640. During operation, the operational instructions are also loaded into memory 620. Processor 610 executes instructions from memory 620 and operates LMock management module 630 to execute a unit test in an object-oriented programming language. In some embodiments, the object-oriented programming language is JAVA brand computer programs.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A computer-executable method for testing a multi-threaded software application, comprising:

in response to invocation of a mock object, identifying, by a computer, a thread which has invoked the mock object, the mock object being a routine that simulates functionalities of a real object in the multi-thread software application;

determining that the identified thread is not associated to a tied actor, wherein the tied actor has a predefined role to the mock object;

upon determining that the identified thread is not associated to the tied actor, determining whether a description of the identified thread matches a description associated with identifying information of an untied actor, wherein determining comprises checking untied actors for a match with the identified thread and associating a first matched untied actor with the identified thread;

creating a first tied actor by tying the first matched untied actor to the identified thread;

associating a role with the first tied actor;

associating an expectation or a stub with the role;

evaluating whether the expectation or the stub is properly executed based on a simulation of the mock object; and upon determining that the expectation or the stub is not properly executed and an error has occurred:

guarding the error within the role; and terminating the identified thread.

2. The method of claim 1, wherein the identifying information associated with the untied actor corresponds to a thread object or a thread checker.

3. The method of claim 2, wherein the thread checker is defined using a thread name, a class name, or a user-defined thread property.

4. The method of claim 1, further comprising marking an error on the role of the tied actor.

5. The method of claim 4, further comprising sharing the error with a testing thread.

6. The method of claim 1, wherein the expectation and the stub are expressed based on the role; and
wherein the role includes the tied actor and, optionally, one or more additional actors.

7. The method of claim 6, further comprising creating a default role for a testing thread, wherein the default role is associated with an expectation or a stub not expressed based on a role.

8. The method of claim 6, wherein guarding the error comprises storing information regarding the error associated with the role.

9. The method of claim 8, further comprising sharing the error with a second thread, wherein a second actor corresponding to the second thread is included in the role.

10. The method of claim 8, further comprising sharing the error with a testing thread.

11. A non-transitory computer-readable storage medium storing instructions that when executed by a computer cause the computer to perform a method for testing a multi-threaded software application, the method comprising:
in response to invocation of a mock object, identifying, by a computer, a thread which has invoked the mock object, the mock object being a routine that simulates functionalities of a real object in the multi-thread software application;
determining that the identified thread is not associated to a tied actor, wherein the tied actor has a predefined role to the mock object;
upon determining that the identified thread is not associated to the tied actor, determining whether a description of the identified thread matches a description associated with identifying information of an untied actor, wherein determining comprises checking untied actors for a match with the identified thread and associating a first matched untied actor with the identified thread;
creating a first tied actor by tying the first matched untied actor to the identified thread;
associating a role with the first tied actor;
associating an expectation or a stub with the role;
evaluating whether the expectation or the stub is properly executed based on a simulation of the mock object;
upon determining that the expectation or the stub is not properly executed and an error has occurred:
guarding the error within the role; and
terminating the identified thread; and
upon determining that the expectation or the stub is not properly executed, completing an execution of the thread.

12. The storage medium of claim 11, wherein the description identifying information associated with the actor corresponds to a thread object or a thread checker.

13. The storage medium of claim 12, wherein the thread checker is defined using a thread name, a class name, or a user-defined thread property.

14. The storage medium of claim 11, wherein the method further comprises sharing the error with a testing thread.

15. The storage medium of claim 11, wherein the expectation and the stub are expressed based on the role; and
wherein the role includes the actor and, optionally, one or more additional actors.

16. The storage medium of claim 15, wherein the method further comprises creating a default role for a testing thread, wherein the default role is associated with an expectation or a stub not expressed based on a role.

17. The storage medium of claim 15, wherein the method further comprises storing the error associated with the role.

18. The storage medium of claim 17, wherein the method further comprises sharing the error with a second thread, wherein a second actor corresponding to the second thread is included in the role.

19. The storage medium of claim 17, wherein the method further comprises sharing the error with a testing thread.

20. A computer system, comprising:
a processor;
a memory coupled to the processor;
a thread-identifying mechanism configured to, in response to an invocation of a mock object, identify a thread which has invoked the mock object, the mock object being a routine that simulates functionalities of a real object in the multi-thread software application;
a determining mechanism configured to:
determine that the identified thread is not associated to a tied actor, wherein the tied actor has a predefined role in the mock object; and
upon determining that the identified thread is not associated to a tied actor:
determine whether a description of the identified thread matches a description associated with identifying information of an untied actor, wherein the determination comprises checking untied actors for a match with the identified thread and associating a first matched untied actor with the identified thread;
create a first tied actor by tying the first matched untied actor to the identified thread;
associate a role with the first tied actor, and
associate an expectation or a stub with the role;
an evaluation mechanism configured to, evaluate whether an expectation or a stub associated with a role of the actor is properly executed;
a value-return mechanism configured to return a value representative of an error when the expectation or the stub is not properly executed; and
upon determining that the expectation or the stub is not properly executed and an error has occurred:
guard the error within the role, and
terminate the identified thread.

21. The storage medium of claim 11, wherein upon associating a role with the tied actor, determining if the role is a associated with an error; and
if the role is associated with an error, terminating an execution of the thread without executing the mock object.

* * * * *